(12) United States Patent
Berger et al.

(10) Patent No.: US 7,629,299 B2
(45) Date of Patent: Dec. 8, 2009

(54) PROCESS FOR RECOVERING RESIDUAL OIL EMPLOYING ALCOHOL ETHER SULFONATES

(75) Inventors: Paul Daniel Berger, Sugar Land, TX (US); Christie Huimin Berger, Sugar Land, TX (US); Guohua Cao, Missouri City, TX (US); Oliver Hsu, Missouri City, TX (US)

(73) Assignee: Oil Chem Technologies, Sugar Land, TX (US)

( * ) Notice: Subject to any disclaimer, the term of this patent is extended or adjusted under 35 U.S.C. 154(b) by 74 days.

(21) Appl. No.: 12/009,429

(22) Filed: Jan. 19, 2008

(65) Prior Publication Data

US 2008/0176772 A1 Jul. 24, 2008

Related U.S. Application Data

(60) Provisional application No. 60/881,733, filed on Jan. 20, 2007.

(51) Int. Cl.
*C09K 8/588* (2006.01)
(52) U.S. Cl. .................. 507/227; 507/255; 252/554
(58) Field of Classification Search ................ 507/227, 507/255; 252/554
See application file for complete search history.

(56) References Cited

U.S. PATENT DOCUMENTS

| 4,862,963 | A | * | 9/1989 | Gregory | .................. 166/270.1 |
| 4,865,774 | A | | 9/1989 | Fabry et al. | |
| 5,075,042 | A | | 12/1991 | Allison et al. | |

OTHER PUBLICATIONS

Cayais, et al. Modeling Crude Oils for Low Interfacial Tension SPE J (Dec. 1976) p. 351-387.
Felber, Betty Selected US Dept of Energy's for Technology Applications SPE 84904 (2003).
Pitts, et al. Alkaline-Surfactant- Polymer Flood of the Tanner Field SPE 10004 (2006).

* cited by examiner

*Primary Examiner*—Timothy J. Kugel
*Assistant Examiner*—Atnaf Admasu

(57) ABSTRACT

A method of recovering crude oil from a subterranean hydrocarbon containing formation which comprises (a) injecting into said formation an aqueous solution containing an effective amount alkali metal, alkaline-earth or ammonium salts of alcohol ether sulfonates derived from unsaturated alcohol ethers, and (b) displacing said solution into one or more injection wells and recovering the oil from one or more production wells. The unsaturated alkoxylated alcohol contain various amounts of ethylene oxide, propylene oxide and butylene oxides elected to optimize their interfacial properties with different types of crude oil with different brines.

10 Claims, 3 Drawing Sheets

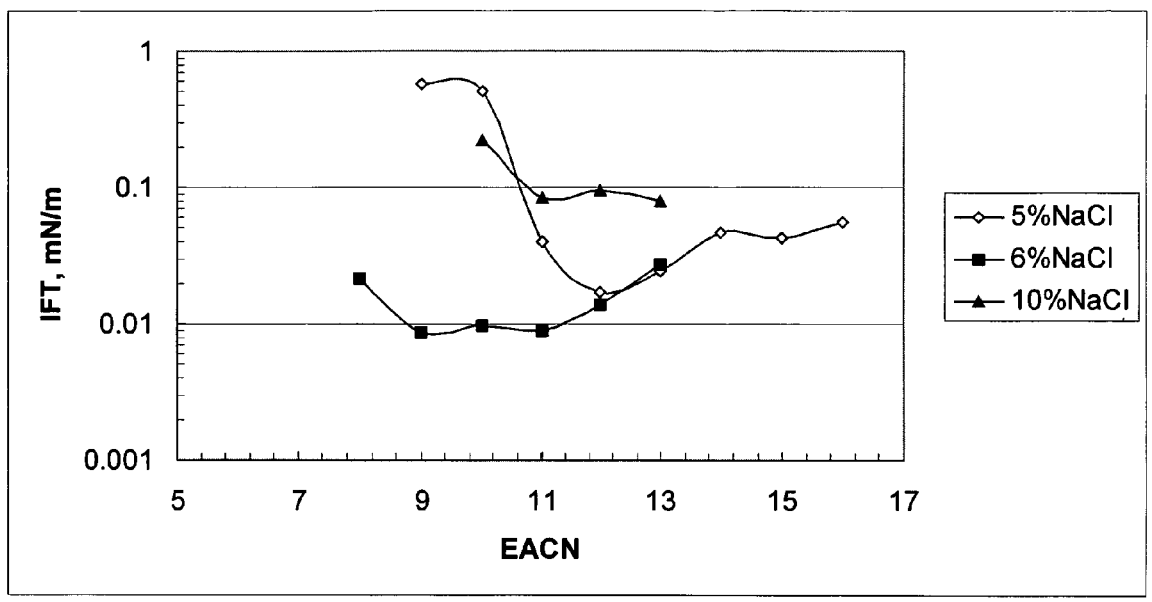
Figure 1 Determining minimum IFT for hydrocarbons against aqueous solutions of varying salinities.

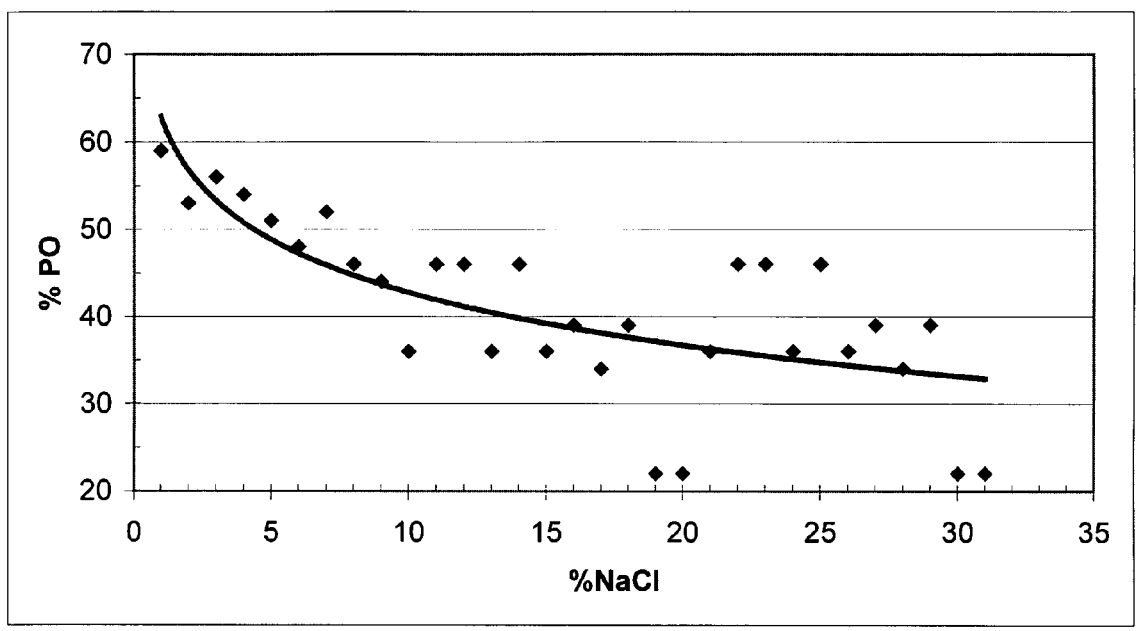
FIG. 2 Effect of salt concentration and wt% PO on minimum IFT.

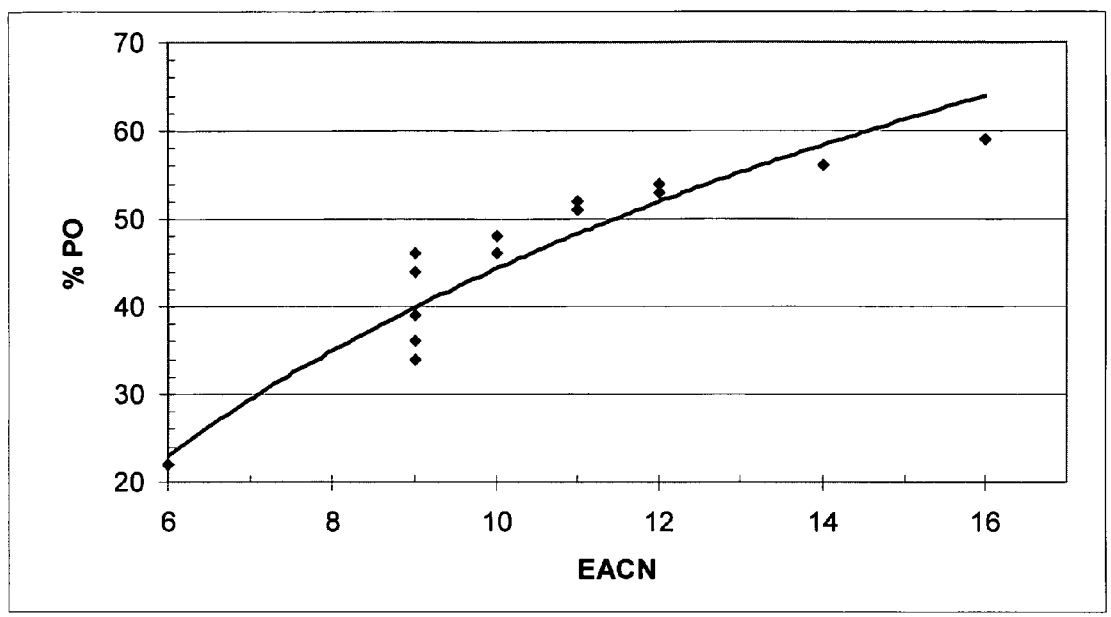
FIG. 3 Effect of EACN and wt% PO on minimum IFT.

PROCESS FOR RECOVERING RESIDUAL OIL EMPLOYING ALCOHOL ETHER SULFONATES

CROSS REFERENCE TO RELATED APPLICATIONS

This application is based on provisional application Ser. No. 60/881,733, filed on Jan. 20, 2007.

STATEMENT REGARDING FEDERALLY SPONSORED RESEARCH OR DEVELOPMENT

Not Applicable

DESCRIPTION OF ATTACHED APPENDIX

Not Applicable

FIELD OF INVENTION

The present invention is directed to Enhanced Oil Recovery (EOR). More specifically, the present invention is directed to EOR employing alcohol ether sulfonates derived from alkoxylated un-saturated alcohol.

BACKGROUND OF THE INVENTION

Many examples of the use of surfactants either alone or in combination with other additives to recover residual oil appear in the literature. SPE 84904 reviews some of the various EOR technologies that have been sponsored by the US Department of Energy. SPE 78711 and SPE 100004 describes the use of the Alkali Surfactant Polymer(ASP) process to recover significant residual oil from fields that have been extensively waterflooded. Although these and many more publications and patents support the viability of using surfactants to recover residual oil, some the shortcomings of presently utilized surfactants have not been satisfactorily addressed. A thermally stable, salt tolerant surfactant made from renewable resources that is biodegradable and can be economically manufactured surfactant is desired for EOR.

The alcohol ether sulfonates of the present invention are made from renewable resources and are thermally stable, salt tolerant, biodegradable and can be economically manufactured. They may be used alone or in combination with alkali, polymers, co-solvents, chelating agents and other commonly used oil field additives. The function of the surfactant is to lower the Interfacial Tension (IFT) between the injection brine and the oil trapped in the micoscopic capillary pore spaces within the reservoir and also to change the wettability of the reservoir rock. The function of the polymer, that is employed with the surfactant in some cases, is to increase the viscosity of the injection brine in order to overcome viscous fingering and to improve the sweep efficiency of the injected brine. Alkali is also used in one cases to reduce the amount of surfactant and/or polymer adsorbed onto the surface of the reservoir rock and also to react with the small amount of acids and acid precursors present in most crude oils thus forming "in situ" surfactant that acts synergistically with the injected surfactant to give even lower IFT.

Ether sulfonates are a class of surfactants that have been found to be both salt tolerant and thermally stable. Currently available ether sulfonates are limited in their use in EOR because they are either very costly to manufacture or they involve the use of very toxic intermediates for their manufacture. For example U.S. Pat. No. 5,075,042 to Allison et al. describes the preparation of aliphatic poly(ethleneoxy)sulfonates by the chlorinatiuonal with thionyl chloride of an ethoxylated aliphatic alcohol and subsequent conversion of the resulting chloride to the sulfonate with sodium sulfite.

U.S. Pat. No. 4,865,774 to Fabry, et al. in 1989 discloses the synthesis of surface-active hydroxsulfonates made through the reaction of unsaturated fatty alkenyl or fatty alkenylpolyalkoxy esters. This patent describes the procedure for preparing such surface-active agents, for example, from oleyl alcohol. The alcohol is first esterified with acetic anhydride. The acetate ester is used to produce a final product containing sodium acetate as a by-product. It is not necessary to start with the acetate ester if the final product is to be used in soft water since the sodium sulfate formed when the final product is neutralized will not cause any precipitation problems in the absence of significant concentrations of divalent cations. This is followed by sulfonation with $SO_3$ and neutralization with sodium hydroxide (NaOH). The procedure was also carried out starting with oleyl alcohol with 2 moles and 5 moles of ethylene oxide (EO). Calcium hydroxide and ammonium hydroxide were also used to neutralize the acid formed during sulfonation and to remove the acetate. The final products were tested and found to be an excellent wetting agents suitable for inclusion as components in cleaning compositions. We have now found that these type of surfactants are excellent IFT reducing compounds suitable for inclusion in injection brines for application at high temperatures and/or in high TDS brines even those containing significant amounts of divalent cations such as calcium and magnesium. This is unexpected considering the structure of these surfactants is such that the oil soluble hydrophobic and the water soluble hydrophilic portion of the molecule are not distinctly separated.

SUMMARY OF THE INVENTION

The present invention relates to recovering crude oil from a subterranean hydrocarbon bearing formation by surfactant flooding and addresses the previously recited desirable features and also provides other benefits obvious to the ordinary skilled artisan. The process is especially useful when the reservoir has high temperature, high total salinity and high di-valent cations in the injection brine and connate brine.

The primary object of the invention is to provide a process for the recovery of oil from subterranean reservoirs employing thermally stable, salt tolerant surfactants.

The present invention relates a method of recovering crude oil from a subterranean hydrocarbon containing formation which comprises (a) injecting into said formation an aqueous solution containing an effective amount alkali metal, alkaline-earth or ammonium salts of alcohol ether sulfonates derived from unsaturated alcohol ethers, and (b) displacing said solution into one or more injection wells and recovering the oil from one or more production wells.

The aqueous solution of the present invention may also include the option of adding polymers, co-surfactant, alkali and other commonly used oil well treating compounds.

Other objects and advantages of the present invention will become apparent from the following descriptions, taken in connection with the accompanying tables and figures, wherein, by way of illustration and example, an embodiment of the present invention is disclosed.

DESCRIPTION OF THE DRAWINGS

FIG. 1 shows the determination of the minimum IFT for differents alkanes at various salt concentrations.

FIG. 2 shows the relationship between salt concentration in the injection fluid and wt % propylene oxide in the surfactant in determining minimum IFT.

FIG. 3 shows the relationship between the EACN of the oil and wt % propylene oxide in the surfactant in determining minimum IFT.

DETAILED DESCRIPTION OF THE INVENTION

Detailed descriptions of the invention are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The present invention relates a method of recovering crude oil from a subterranean hydrocarbon containing formation which comprises (a) injecting into said formation an aqueous solution containing an effective amount alkali metal, alkaline-earth or ammonium salts of alcohol ether sulfonates derived from unsaturated alcohol ethers, and (b) displacing said solution into one or more injection wells and recovering the oil from one or more production wells.

The injection wells may be the same as the producing wells. Alternatively different wells may be used as injection and producing wells. The alcohol ether sulfonates having the structures I and II shown below are derived from unsaturated alcohol ethers.

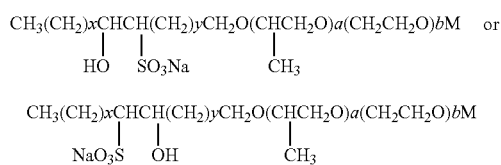

where;
M is Na, K, NH$_3$, Ca, Mg, or an amine
a=0 to 20
b=0 to 20
x+y+z=5 to 19

Butylene oxide may be substituted for propylene oxide in the above structure with similar results, but due to the historically higher cost of butylene oxide compared to propylene oxide, the latter is preferred. The values of x+y+z, a, and b are chosen depending on the properties of the oil to be recovered, the aqueous injection fluid to be used for injecting the surfactant, the connate brine, the bottom hole temperature, and the type of formation. The properties of the aqueous injection fluid that are important in determining these values are the Total Dissolved Solids and the amount of divalent cations present. The properties of the oil are determined by its Equivalent Alkane Carbon Number (EACN). One is referred to Cayias, Schecter and Wade "Modeling Crude Oil for Low Interfacial Tension" SPE 5813 (1976) for more details on EACN. The EACN is a means of characterizing oils by the average carbon number of the hydrocarbon components of which the oil is composed.

The alkoxylated, unsaturated alcohols that are sulfonated and neutralized to form structures I and/or II above, include but are not limited to decenyl, dodecenyl, tridecenyl, tetradecenyl, hexadecenyl, heptadecenyl, octadecenyl, eicosenyl, docosenyl, tetracosenyl, hexacosenyl, and tricosenyl alcohol alkoxylates. Multi-unsaturated such as linolenyl alcohol and linoleyl alcohol alkoxylates may also be used but the mono unsaturated alcohol alkoxylates are preferred. Branched chain as well as linear, unsaturated alcohol alkoxylates may be used. Internal unsaturated alcohol alkoxylates, such as those derived from secondary and tertiary alcohols having one or more position of unsaturation may also be used. Unsaturated alcohols derived from natural sources are preferred. These include oleyl alcohol and erucyl alcohol.

The surfactant is dissolved into the aqueous injection fluid along with other components, if necessary, that are known to the art to impart certain properties to the aqueous injection fluid. These components may include, but are not limited to, polymers and other viscosifying agents to improve the sweep efficiency and mobility ratio of the injection fluid. Also, alkalis including but not limited to, sodium hydroxide, sodium carbonate, sodium silicate may be added to reduce adsorption of surfactant and/or thickening agent and to produce "in-situ" surfactant that may act synergistically with the injected surfactant. Co-solvents are also sometimes added to prevent gellation, to improve the product handling characteristics, and to act synergistically with the surfactant. Co-solvents may include, but are not limited to, low carbon number alcohols, alcohol ethers, and glycols. Other surfactants may be added to the injection fluid to provide additional interfacial lowering properties. These include but are not limited to, alcohol ethers, alcohol ether sulfates, olefin sulfonates, alkyl betaines, phosphate esters, ether carboxylates, alkyl glucosides, alkane sulfonates, alkylaryl sulfonates, arylalkyl sulfonates, alkylphenol alkoxylates, sulfonated alkylphenol alkoylates, sulfated alkylphenol alkoxylates. The aqueous injection fluid containing the alcohol ether sulfonate surfactant in a concentration necessary to provide ultra-low IFT along with one or more of the other components described above, if necessary, is injected into one or more injection wells where it is allowed to contact the oil trapped in the reservoir. Subsequently the oil is recovered from one or more producing wells.

The concentration of alcohol ether sulfonate surfactant used in the aqueous injection fluid is generally between 0.01 wt % and 3.0 wt %. Other components are added, as necessary, in concentrations found acceptably to give the desired property.

Example 1

This example illustrates the general procedure for the preparation of the alcohol ether sulfonates used in the present invention. In this case the preparation of the alkyl ether sulfonate derived from oleyl alcohol having 6 moles of propylene oxide (PO) is described. The following example starts with the alkoxylated alcohol, however, the acetate ester of the alkoxylated alcohol may also be used as the starting material as described in the aforementioned U.S. Pat. No. 4,865,774.

An unsaturated oleyl alcohol was propoxlated with 6 moles of propylene oxide using technology commonly known to the art. The propoxylate was sulfonated with sulfur trioxide (SO$_3$) using a thin film air/SO$_3$ unit as is also well known in the art. This reaction is shown in reaction I below. The resulting oleyl ether sulfonic/sulfate acid was immediately neutralized with aqueous sodium hydroxide to give a 40% solution of the oleyl ether sulfate/sulfonate salt (reaction II below).

The 40% solution was subsequently refluxed in the presence of enough additional NaOH to hydroyze the sulfate (reaction III below) and form the sodium salt of oleyl alcohol 6 mole propoxylated sufonate and sodium sulfate ($Na_2SO_4$) by-product (reaction IV below) where x+y+z=14.

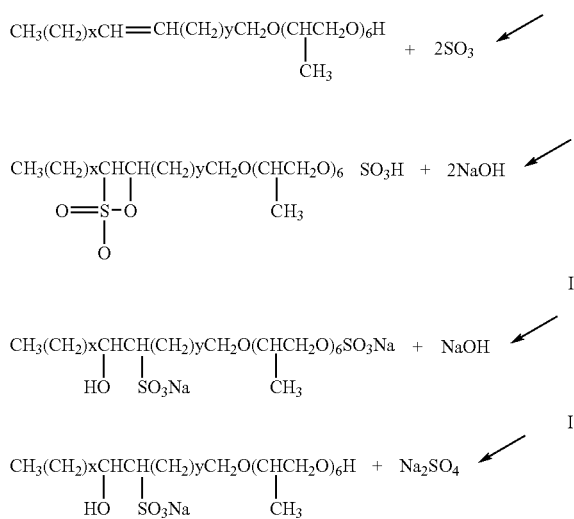

Example 2

This example illustrates the effectiveness of the alcohol ether sulfonate in lowering IFT for a particular EACN and salinity.

Solutions of 5, 6, and 10 wt % NaCl each containing 0.3 wt % of the oleylether sulfonate from reaction IV of Example 1 were prepared. The interfacial tensions of each of these solutions against a series of pure hydrocarbons was measured at 25° C. after 30 minutes contact time using a UT Model 500 spinning drop interfacial tensiometer. The results obtained are shown in FIG. 1.

From the results of FIG. 1 the EACN where the minimum IFT occurs for each salt concentration can be obtained. These results show the relationship of the IFT at various NaCl concentration for different hydrocarbons. The hydrocarbons are designated by their EACN on FIG. 1. For example octane is shown with an EACN of 8, dodecane with an EACN of 12.

Example 3

This example illustrate the effect of moles PO and EO on the IFT reduction properties of the alcohol ether sulfonates at various salinities using dodecane (EACN=12) as the oil. The reactions used to prepare the oleyl ether sulfonates are as described in Example 1 above.

Table 1 shows the relationship between the number of moles of propylene oxide and the wt % propylene oxide for the various oleyl ether sulfonates studied. Each oleyl ether sulfonate was prepared from the corresponding oleyl alcohol ether using the procedure previously described.

TABLE 1

| Oleyl Ether Sulfonates | | | |
| --- | --- | --- | --- |
| Sample No. | Moles PO | Mole EO | % PO by wt |
| Oleyl Ether Sulfonate 2-0 | 2 | 0 | 22 |
| Oleyl Ether Sulfonate 4-0 | 4 | 0 | 36 |
| Oleyl Ether Sulfonate 6-0 | 6 | 0 | 46 |
| Oleyl Ether Sulfonate 6-1 | 6 | 1 | 44 |
| Oleyl Ether Sulfonate 6-2 | 6 | 2 | 41 |
| Oleyl Ether Sulfonate 6-3 | 6 | 3 | 38 |
| Oleyl Ether Sulfonate 8-0 | 8 | 0 | 53 |
| Oleyl Ether Sulfonate 8-1 | 8 | 1 | 51 |
| Oleyl Ether Sulfonate 8-2 | 8 | 2 | 48 |
| Oleyl Ether Sulfonate 8-3 | 8 | 3 | 46 |
| Oleyl Ether Sulfonate 8-4 | 8 | 4 | 44 |
| Oleyl Ether Sulfonate 10-0 | 10 | 0 | 59 |
| Oleyl Ether Sulfonate 10-1 | 10 | 1 | 56 |
| Oleyl Ether Sulfonate 10-2 | 10 | 2 | 54 |
| Oleyl Ether Sulfonate 10-3 | 10 | 3 | 52 |

FIG. 2 shows the results obtained by plotting the points at which the minimum IFT is obtained for various combinations of wt % PO in the oleyl ether sulfonate and wt % NaCl in the aqueous phase using dodecane (EACN=12) as the oil phase.

FIG. 3 shows the results obtained by plotting the points at which the minimum IFT is obtained with various combinations of wt % PO in the oleyl ether sulfonate and EACN of the oil phase using 15% NaCl in the aqueous phase.

As can be seen from the data depicted in FIGS. 2 and 3 there exists a relationship between the wt % PO in the surfactant and the EACN of the oil phase at which the minimum IFT is obtained. Likewise there exist a relationship between the wt % PO in the surfactant at which the minimum IFT is obtained and the wt % NaCl in the aqueous phase. There exists an inverse logarithmic relationship between wt % PO and wt % NaCl. As the wt % NaCl increases the amount of PO in the surfactant required to give minimum IFT decreases. There exists a direct logarithmic relationship between the w % PO in the surfactant and the EACN of the oil phase. As the EACN of the oil phase increases the amount of PO in the surfactant required to give a minimum IFT increases.

The relationships depicted in FIGS. 2 and 3 can thus be used to select the proper surfactant to use for any particular oil/water combination if the salinity of the aqueous injection brine is known and the EACN of the oil is known. In most cases the salinity of the injection brine to be used for an EOR project is known or can easily be determined. The EACN of the oil is usually not available. The surfactant to be used is therefore selected by determining the IFTs of various solutions of surfactants containing various amounts of PO and/or PO and EO, measured at the bottom hole temperature and in an aqueous solution simulating the composition and salinity of the injection brine to be used for the EOR project. The surfactant giving the lowest IFT under these conditions is then selected as the one most likely to recover residual oil.

Example 4

This example shows the thermal stability for a series of alcohol ether sulfonates derived from oleyl alcohol. Each material was prepared by the procedure described in Example 1 above.

0.1 wt % solutions of each samples were prepared in a sythetic brine containing 3.0 wt % NaCl, 0.5 wt % $CaCl_2$-2H2O and 0.5 wt % $MgCl_2$-6H2O. The samples were analyzed for anionic activity using the two phase titration procedure by titration with Hyamine. The samples were then held at 95° C. and analyzed periodically for activity and the activity loss was determined by comparison with the initial concentration. The results are shown in Table 2 below.

TABLE 2

Aging study at 95° C. for various ether sulfonates

| Sample No. | % Ether Sulfonate Remaining | | |
|---|---|---|---|
| | 1 day | 7 day | 30 day |
| Oleyl Ether Sulfonate 4-0 | 99.1 | 99.0 | 98.6 |
| Oleyl Ether Sulfonate 6-0 | 99.4 | 99.2 | 98.8 |
| Oleyl Ether Sulfonate 6-1 | 99.1 | 99.2 | 96.8 |
| Oleyl Ether Sulfonate 6-2 | 99.1 | 99.0 | 97.7 |
| Oleyl Ether Sulfonate 6-3 | 99.5 | 99.1 | 97.1 |

Example 5

This example demonstrate the application of the present invention in a crude oil and brine obtained from a Southeast Asia oil field The density of the crude oil is 0.8213. Bottom hole temperature is 95° C., and injection fluid salinity is 63,500 ppm. The IFT between the aqueous injection fluid without surfactant and the oil was found to be 15.7 mN/m. The IFT of the aqueous injection fluid containing 0.3 wt % oleyl ether sulfonate 6-0 was measured after 30 minutes at 95° C. and found to be $5.38 \times 10^{-3}$ mN/m. Based on the magnitude of the reduction in IFT, the capillary number will be increased by more than 3000 allowing the aqueous injection fluid to penetrate the reservoir and replace the trapped oil. The IFT was repeated after the fluid was aged at 95° C. for 30 days and the IFT remained unchanged.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A method of recovering crude oil from a subterranean hydrocarbon containing formation which comprises (a) injecting into said formation an aqueous solution containing one or more alcohol ether sulfonate surfactants derived from unsaturated alcohol ethers that are chosen to lower the Interfacial Tension (IFT) between the injection brine and the oil trapped in the microscopic capillary pare spaces within the reservoir and also to change the wettability of the reservoir, and, (b) displacing said solution into one or more injection wells and recovering the oil from one or more production wells.

2. The method of recovering crude oil from a subterranean hydrocarbon containing formation as described in claim 1 where the one or more alcohol ether sulfonate surfactants are prepared by the sulfonation of an unsaturated alcohol ether.

3. The method of recovering crude oil from a subterranean hydrocarbon containing formation as described in claim 1 where the one or more alcohol ether sulfonate surfactants are prepared by the sulfonation of an unsaturated alcohol ether derived from one or more alcohols from the group: decenyl, dodecenyl, tridecenyl, tetradecenyl, hexadecenyl, heptadecenyl, octadecenyl, eicosenyl, docosenyl, tetracosenyl, hexacosenyl, and tricosenyl alcohol.

4. The method of recovering crude oil from a subterranean hydrocarbon containing formation as described in claim 1 where the aqueous injection fluid may contain one or more viscosifying agents.

5. The method of recovering crude oil from a subterranean hydrocarbon containing formation as described in claim 1 where the one or more alcohol ether sulfonate surfactants are prepared by the sulfonation of an unsaturated alcohol ether containing from 0 to 20 moles of ethylene oxide.

6. The method of recovering crude oil from a subterranean hydrocarbon containing formation as described in claim 1 where the one or more alcohol ether sulfonate surfactants are prepared by the sulfonation of an unsaturated alcohol ether containing from 0 to 20 moles of propylene oxide.

7. The method of recovering crude oil from a subterranean hydrocarbon containing formation as described in claim 1 where the one or more alcohol ether sulfonate surfactants are prepared by the sulfonation of an unsaturated alcohol ether containing from 0 to 20 moles of propylene oxide and from 0 to 20 moles of ethylene oxide.

8. The method of recovering crude oil from a subterranean hydrocarbon containing formation as described in claim 1 where the aqueous injection fluid may contain one or more cosolvents.

9. The method of recovering crude oil from a subterranean hydrocarbon containing formation as described in claim 1 where the aqueous injection fluid may contain one or more alkalis.

10. The method of recovering crude oil from a subterranean hydrocarbon containing formation as described in claim 1 where the one or more injection wells also serve as the one or more producing wells.

* * * * *